US008605602B2

(12) United States Patent
Emori et al.

(10) Patent No.: US 8,605,602 B2
(45) Date of Patent: Dec. 10, 2013

(54) FIELD COMMUNICATION SYSTEM (75) Inventors: Toshiyuki Emori, Musashino (JP);
Yasuyuki Nakamoto, Musashino (JP);
Hideki Umemoto, Musashino (JP);
Hiroshi Mori, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 153 days.

(21) Appl. No.: 13/162,176

(22) Filed: Jun. 16, 2011

(65) Prior Publication Data
US 2011/0313549 A1 Dec. 22, 2011

(30) Foreign Application Priority Data

Jun. 16, 2010 (JP) .................................. 2010-137147

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*G06F 13/00* (2006.01)
*G06F 13/42* (2006.01)
*H04L 12/40* (2006.01)

(52) U.S. Cl.
CPC ............ *H04L 43/0811* (2013.01); *H04L 43/00* (2013.01); *H04L 43/08* (2013.01); *H04L 43/0805* (2013.01); *H04L 43/0817* (2013.01); *H04L 12/40* (2013.01); *H04L 12/40006* (2013.01)
USPC ........... 370/242; 370/241; 370/252; 710/100; 710/105

(58) Field of Classification Search
CPC . H04L 43/0805; H04L 43/0811; H04L 43/00; H04L 43/08; H04L 43/0817; H04L 12/40; H04L 12/40006
USPC .......... 370/252, 241, 242; 710/100, 107, 110, 710/105
See application file for complete search history.

(56) References Cited

U.S. PATENT DOCUMENTS

| | | | |
|---|---|---|---|
| 6,738,388 B1 * | 5/2004 | Stevenson et al. ............ 370/465 |
| 8,180,940 B2 * | 5/2012 | Korrek .......................... 710/110 |
| 2002/0002443 A1 * | 1/2002 | Ames et al. ................... 702/188 |

(Continued)

FOREIGN PATENT DOCUMENTS

| | | |
|---|---|---|
| EP | 1686510 A1 | 8/2006 |
| EP | 1770459 A2 | 4/2007 |

(Continued)

OTHER PUBLICATIONS

European Search Report dated Aug. 18, 2011, issued in corresponding European Patent Application No. 11170068.8.

(Continued)

*Primary Examiner* — Ayaz Sheikh
*Assistant Examiner* — Tarell Hampton
(74) *Attorney, Agent, or Firm* — Westerman, Hattori, Daniels & Adrian, LLP (57) ABSTRACT

A field communication system receives data from a field device through a communication network and maps the data onto a register to update the data. The field communication system includes a detection module configured to detect a state of communication with the field device through the communication network, and a writing module configured to write the communication state detected by the detection module in the register as information added to the data.

8 Claims, 5 Drawing Sheets

(56) References Cited

U.S. PATENT DOCUMENTS

2004/0230323 A1* 11/2004 Glanzer et al. .................. 700/18
2006/0287784 A1    12/2006 Kanki
2008/0122611 A1     5/2008 Nagashima et al.

FOREIGN PATENT DOCUMENTS

| | | |
|---|---|---|
| EP | 2196883 A2 | 6/2010 |
| JP | 2002-007166 A | 1/2002 |
| JP | 2004-128785 A | 4/2004 |
| JP | 2006-39892 A | 2/2006 |
| JP | 2006-352553 A | 12/2006 |

OTHER PUBLICATIONS

Japanese Office Action dated Apr. 10, 2012, issued in corresponding Japanese Patent Application No. 2010-137147 (2 pages).

* cited by examiner

FIC100. UAP2. UAP_STATUS

| | | |
|---|---|---|
| N+0 | 7  STATUS  0 | 31  DATA  24 |
| N+1 | 23  DATA  8 | |
| N+2 | 7  DATA  0 | |

(b)

1 BYTE SHIFT

FIC100. UAP2. UAP_STATUS

| | | |
|---|---|---|
| N+0 | 0 | 7  STATUS  0 |
| N+1 | 31  DATA  16 | |
| N+2 | 15  DATA  0 | |

*FIG. 4*

STATUS

| Bit 7 | Bit 6 | Bit 5 | Bit 4 | Bit 3 | Bit 2 | Bit 1 | Bit 0 |
|---|---|---|---|---|---|---|---|
| Quality | | (reserved) | Substatus | | | Limit condition | |
| 0=Bad<br>1=Uncertain<br>2=Good<br>3=Reserved | | 0 | 0~7 | | | 0~3 | |

QUALITY: Bit 7, Bit 6

SUB-STATUS: Bit 4, Bit 3, Bit 2

FIG. 5

FIELD COMMUNICATION SYSTEM

TECHNICAL FIELD

The present disclosure relates to a field communication system which receives data from a field device through a communication network and maps the data onto a register to update the data.

RELATED ART

A field device having a wireless communication function based on the ISA100.11a field wireless standard and a higher-order apparatus are connected to each other, through a ISA100 wireless gateway based on the ISA100.11a field wireless standard, so that the field device and the higher-order apparatus can perform transmission and reception of data between them. When the higher-order apparatus is a Modbus/TCP client, the transmission and reception of the data become possible by providing an ISA100 backbone router in the ISA100 wireless gateway. The ISA100 backbone router performs wireless communication between a Modbus/TCP server and the field device. A Modbus register for mapping the data is provided in the Modbus/TCP server.

In this case, a field device 1 and a wireless gateway 2 perform wireless communication according to the Publish/Subscribe method based on the ISA100.11a field wireless standard. The process data and the like transmitted from the field device 1 by wireless communication is received through the ISA100 backbone router, and the Modbus/TCP server maps the received process data and the like onto the Modbus register. In addition, the Modbus/TCP client acquires the process data and the like mapped onto the Modbus register from the Modbus/TCP server and performs control or the like using a Modbus/TCP protocol. Thus, by mapping the sequential data onto the Modbus register, the data is updated.

RELATED ART DOCUMENT

Patent Document

[Patent Document 1] JP-A-2002-007166
[Patent Document 2] JP-A-2004-128785

However, when failure of the wireless communication function of the field device, malfunction of the ISA100 wireless network, failure of the ISA100 backbone router, or the like occurs, it is not possible to receive the data from the field device. Accordingly, the process data and the like in the Modbus register are no longer updated from the normal value at the end. The Modbus/TCP client can read the process data or the like which has not been updated and thus, can not detect the occurrence of a malfunction.

SUMMARY

Exemplary embodiments of the present invention provide a field communication system capable of detecting a state where the data is not updated.

A field communication system is configured to receive data from a field device through a communication network and to map the data onto a register to update the data, and the field communication system comprises:

a detection module configured to detect a state of communication with the field device through the communication network; and a writing module configured to write the communication state detected by the detection module in the register as information added to the data.

In this field communication system, since a state of communication with a field device through a communication network is detected and this communication state is written in a register as the information added to the data from the field device, it becomes possible to detect a state where the data is not updated.

Self-diagnosis information of the field device may be included in the data from the field device, and when an abnormality of the communication state is detected by the detection module, the writing module may be configured to reflect the abnormality in the self-diagnosis information by rewriting the self-diagnosis information to be mapped onto the register.

The detection module may be configured to detect, as the communication state, whether or not the field device participates in the communication network.

The detection module may be configured to detect, as the communication state, whether or not reception of the data from the field device through the communication network which has been continued until then has stopped.

The detection module may be configured to detect, as the communication state, whether or not reception of the data from the field device through the communication network continues to be stopped from after the time of participation in the communication network.

The communication network may be a wireless network.

According to the field communication system of the invention, since a state of communication with a field device through a communication network is detected and this communication state is written in a register as the information added to the data from the field device, it becomes possible to detect a state where the data is not updated.

DETAILED DESCRIPTION

Hereinafter, a field communication system according to an embodiment of the invention will be described.

Figure 1:
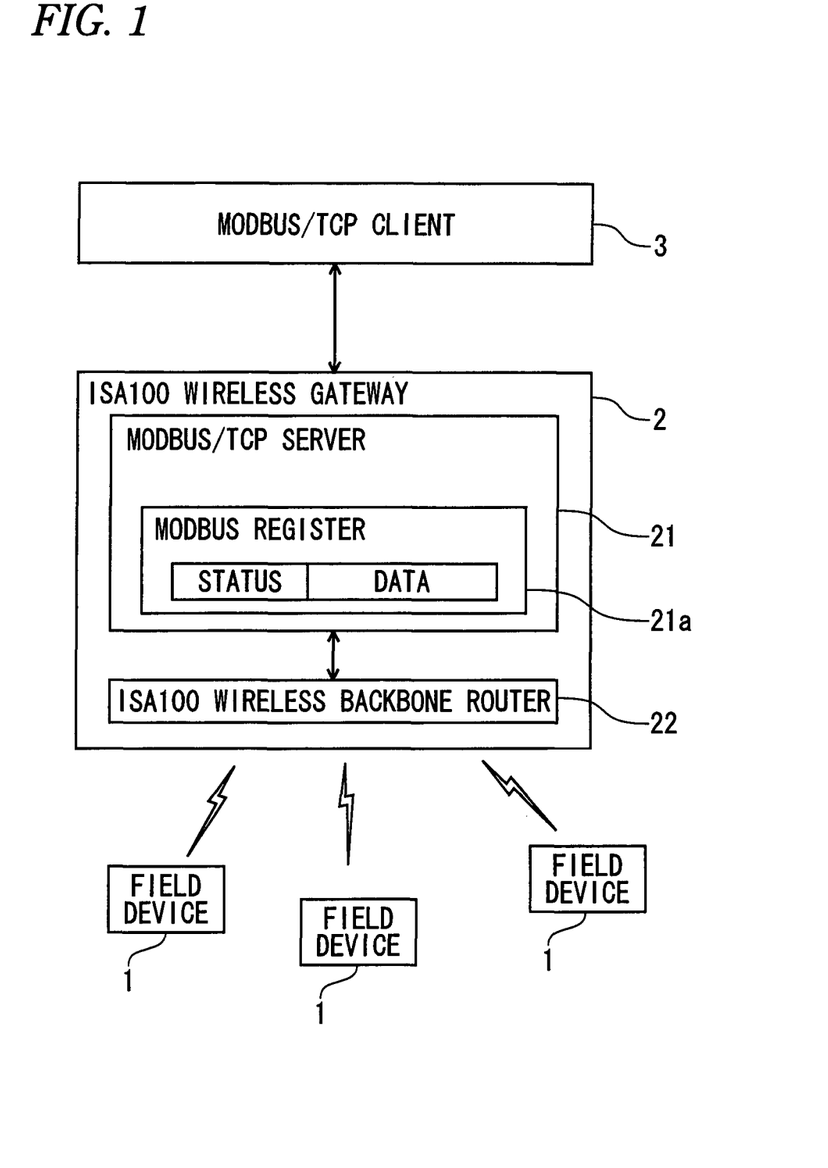
FIG. 1 is a block diagram showing an example of the configuration of a distributed field control system to which a field communication system of the invention is applied.

FIG. 1 is a block diagram showing an example of the configuration of a distributed field control system to which the field communication system of the invention is applied.

As shown in FIG. 1, field devices 1 with a wireless communication function based on the ISA100.11a field wireless standard are disposed in a plant, and each field device 1 is connected to a Modbus/TCP client 3 through an ISA100 wireless gateway 2 based on the ISA 100.11a field wireless standard.

As shown in FIG. 1, the wireless gateway 2 includes a Modbus/TCP server 21 and an ISA100 backbone router 22. The ISA100 backbone router 22 performs wireless communication with the field device 1. A Modbus register 21a is provided in the Modbus/TCP server 21.

In the field communication system of the present embodiment, the Modbus/TCP server 21 functions as detection module and writing module in the invention which will be described later.

The field device 1 and the wireless gateway 2 perform wireless communication according to the Publish/Subscribe method based on the ISA100.11a field wireless standard. The process data and the like transmitted from the field device 1 by wireless communication is received through the backbone router 22, and the Modbus/TCP server 21 maps the received process data and the like onto the Modbus register 21a. In addition, the Modbus/TCP client 3 acquires the process data and the like mapped onto the Modbus register 21a from the Modbus/TCP server 21 using a Modbus/TCP protocol. The Modbus/TCP client 3 performs control based on the acquired process data and the like. The Modbus/TCP client 3 maps an operation value and the like onto the Modbus register 21a of the Modbus/TCP server 21 using the Modbus/TCP protocol. This operation value is given to the field device 1 by wireless communication through the backbone router 22.

Thus, in the field communication system of the present embodiment, the data as a communication object is updated by mapping the data onto the Modbus register 21a.

Figure 2:
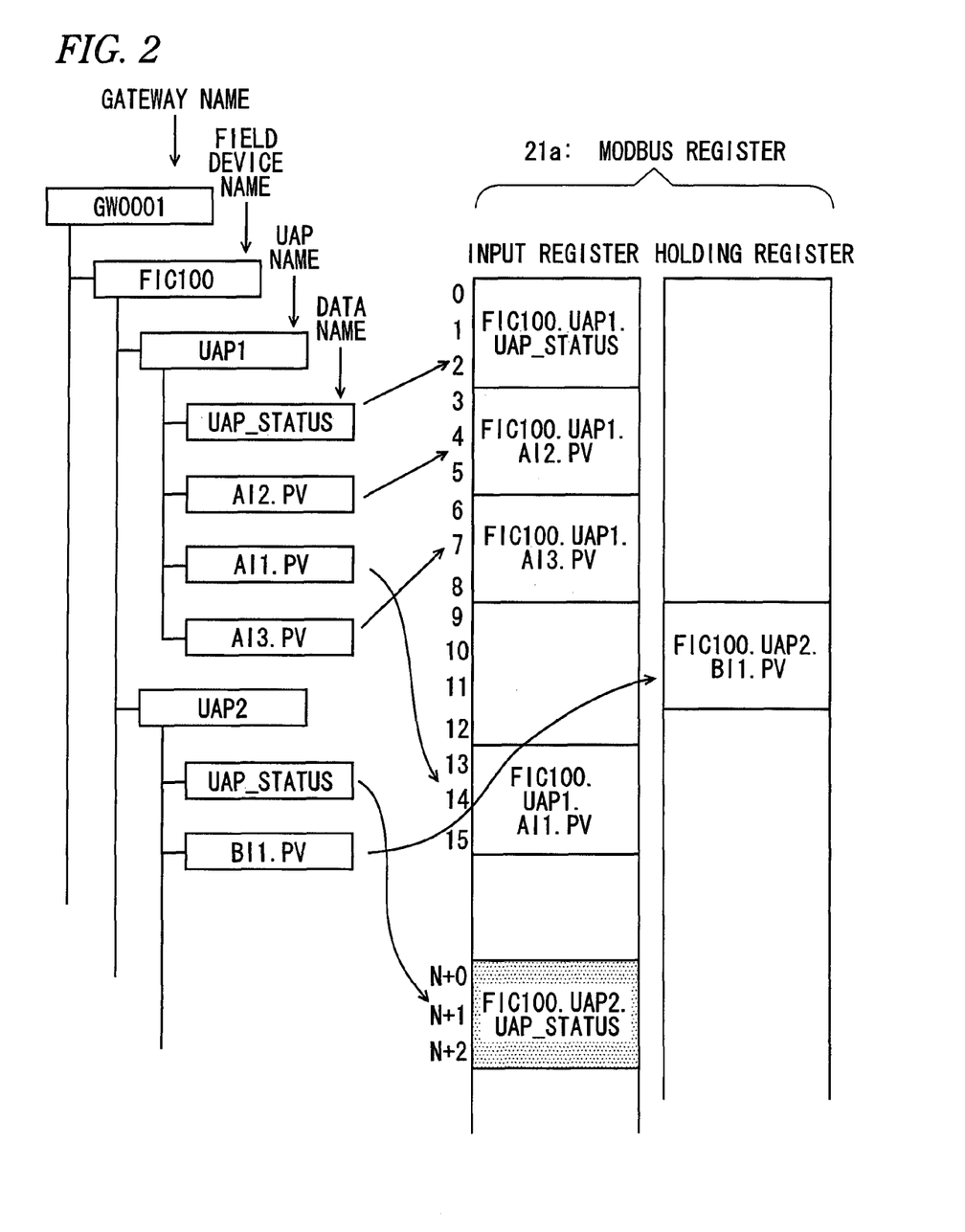
FIG. 2 is a view illustrating the correspondence between the register number of a Modbus register and the data of a field device.

FIG. 2 is a view illustrating the correspondence between the register number of the Modbus register 21a and the data of the field device. Such correspondence is defined in advance by a definition file of Modbus register mapping information. As shown in FIG. 2, the region of the Modbus register 21a is divided into an input register and a holding register. The input register is used for reading of the process data and the like acquired from the field device 1. In the holding register, an operation value and the like from the Modbus/TCP client 3 are written. The input register is used as a read-only region, and the holding register is used as a readable/writable region.

As shown in FIG. 2, the data of a field device is expressed by the hierarchical structure in which a gateway name, a field device name, a UAP (user application) name, and a data name are sequentially used. For example, the data which belongs to the gate name "GW0001" corresponding to the wireless gateway 2 and which is sequentially specified by the field device name "FIC100", the UAP name "UAP1", and the data name "UAP_STATUS" is expressed as "GW0001.FIC100.UAP1.UAP_STATUS", and this data is matched with the register numbers 0 to 2 of the input register.

Similarly, the data expressed as "GW0001.FIC100.UAP1.AI2_PV" is matched with the register numbers 3 to 5 of the input register. In addition, the data expressed as "GW0001.FIC100.UAP2.UAP_STATUS" with graticule in FIG. 2 is matched with the register numbers N+0, N+1, and N+2 of the input register.

Figure 3:
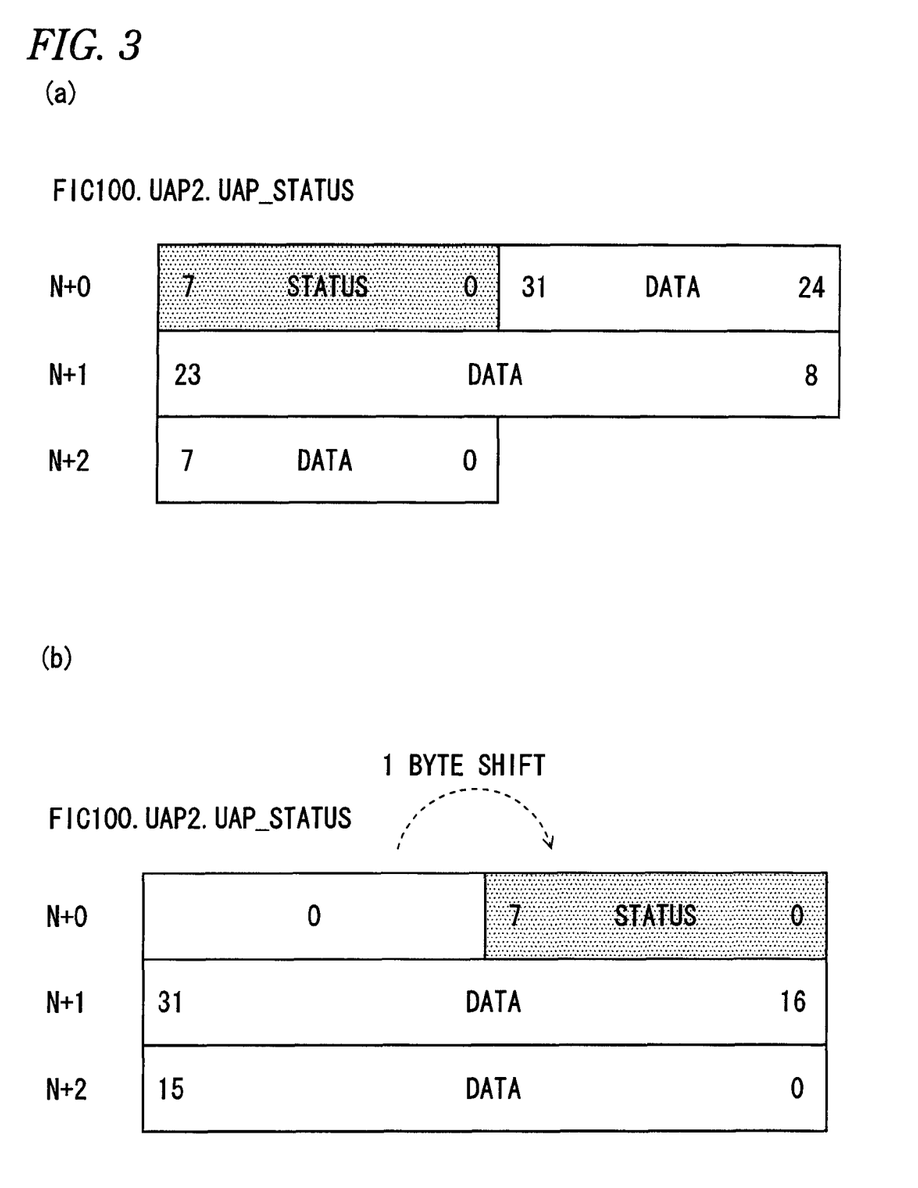
FIGS. 3A and 3B are views showing the data structure of data mapped onto an input register.

FIG. 3A is a view showing the data structure of the data expressed as "GW0001.FIC100.UAP2.UAP_STATUS" which is matched with the register numbers N+0, N+1, and N+2 of the input register.

As shown in FIG. 3A, the data expressed as "GW0001.FIC100.UAP2.UAP_STATUS" has a "data value" of 32 bits and "status" of 8 bits. Each register number corresponds to 16 bits (1 word) as one unit of data reading or data writing. 8 bits of the "status" and higher-order 8 bits of the "data value" with 32 bits are assigned to the register number N+0. The remaining bits of the "data value" with 32 bits are sequentially assigned to the register number N+1 and the register number N+2.

The "data value" of 32 bits is a process data value transmitted from the field device 1 or a value indicating a self-diagnosis result (for example, the state of a battery or a sensor). However, the "data value" of 32 bits may be other data values.

FIG. 3B shows an example of shifting the position of "status" backward by 1 byte when mapping the "status" onto the input register. Thus, by shifting the position of the "status" by 1 byte, it becomes possible to store the "data value" of 32 bits in a 2-word region. As a result, a state where the "data value" straddles the word boundary of the Modbus register 21a can be avoided. In addition, it is possible to prevent the mixture of bits of the "status" and the "data value" in 1 word. Since the Modbus/TCP client 3 reads the information of the Modbus register 21a in word units, it is possible to acquire two continuous words with one request. In addition, if data type conversion of a data group of the two acquired words is performed by the Modbus/TCP client 3, it can be treated as floating point data as it is.

Figure 4:
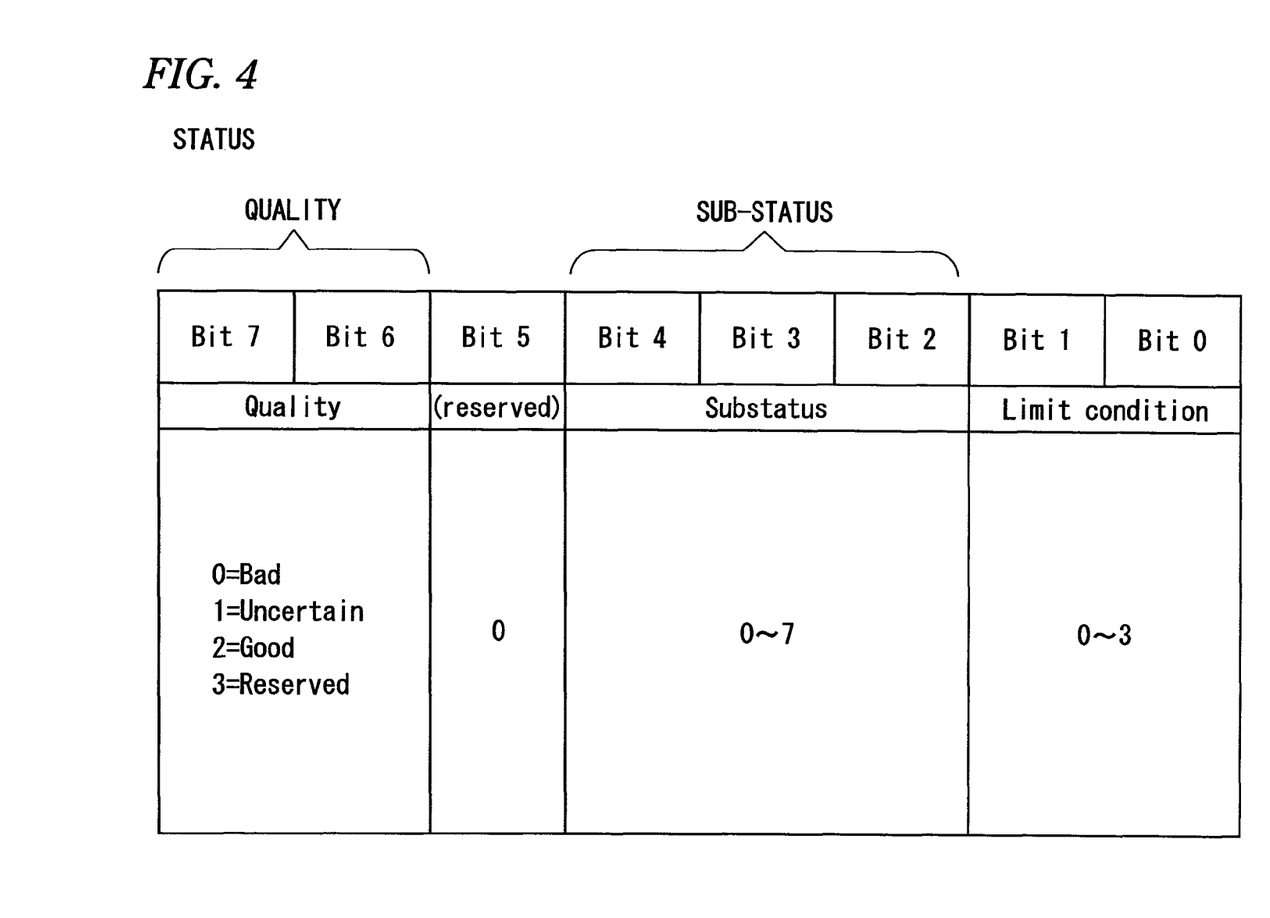
FIG. 4 is a view showing the data structure of "status".

FIG. 4 is a view showing the data structure of the "status".

As shown in FIG. 4, the "status" is configured to include "quality" of 2 bits and "sub-status" of 3 bits. Bits other than the "sub-status" are data transmitted from the field device 1.

The "quality" is data based on self-diagnosis of the field device 1 and indicates the quality of the data value transmitted from the field device 1. When this value is "0", it indicates "bad". When this value is "2", it indicates "good". Moreover, when this value is "1", it indicates that the corresponding field device 1 participates in the ISA100 network and can transmit data, but the data cannot be used for control due to over range or the like.

The "sub-status" is data written in the Modbus register 21a by the Modbus/TCP server 21 on the basis of a state of communication with the field device 1. The Modbus/TCP server 21 attempts communication with each field device 1, for example, periodically and checks the communication state. When the communication state is normal, the Modbus/TCP server 21 copies the data transmitted from the field device 1 to the corresponding region of the Modbus register 21a. However, when the field device 1 does not participate in the ISA100 network, the value of the corresponding "sub-status" is replaced with "2" and is then written in the corresponding region of the Modbus register 21a. When the field device 1 participates in the ISA100 network but the data has not arrived, the value of the corresponding "sub-status" is replaced with "6" and is then written in the corresponding region of the Modbus register 21a. When the data arrives but is interrupted en route, the value of the corresponding "sub-status" is replaced with "5" and is then written in the corresponding region of the Modbus register 21a. In addition, when rewriting the value of the "sub-status" to one of "2", "6", and "5", the Modbus/TCP server 21 replaces the value of the "quality" with "0" indicating "bad" and writes it in the corresponding region of the Modbus register 21a.

Figure 5:
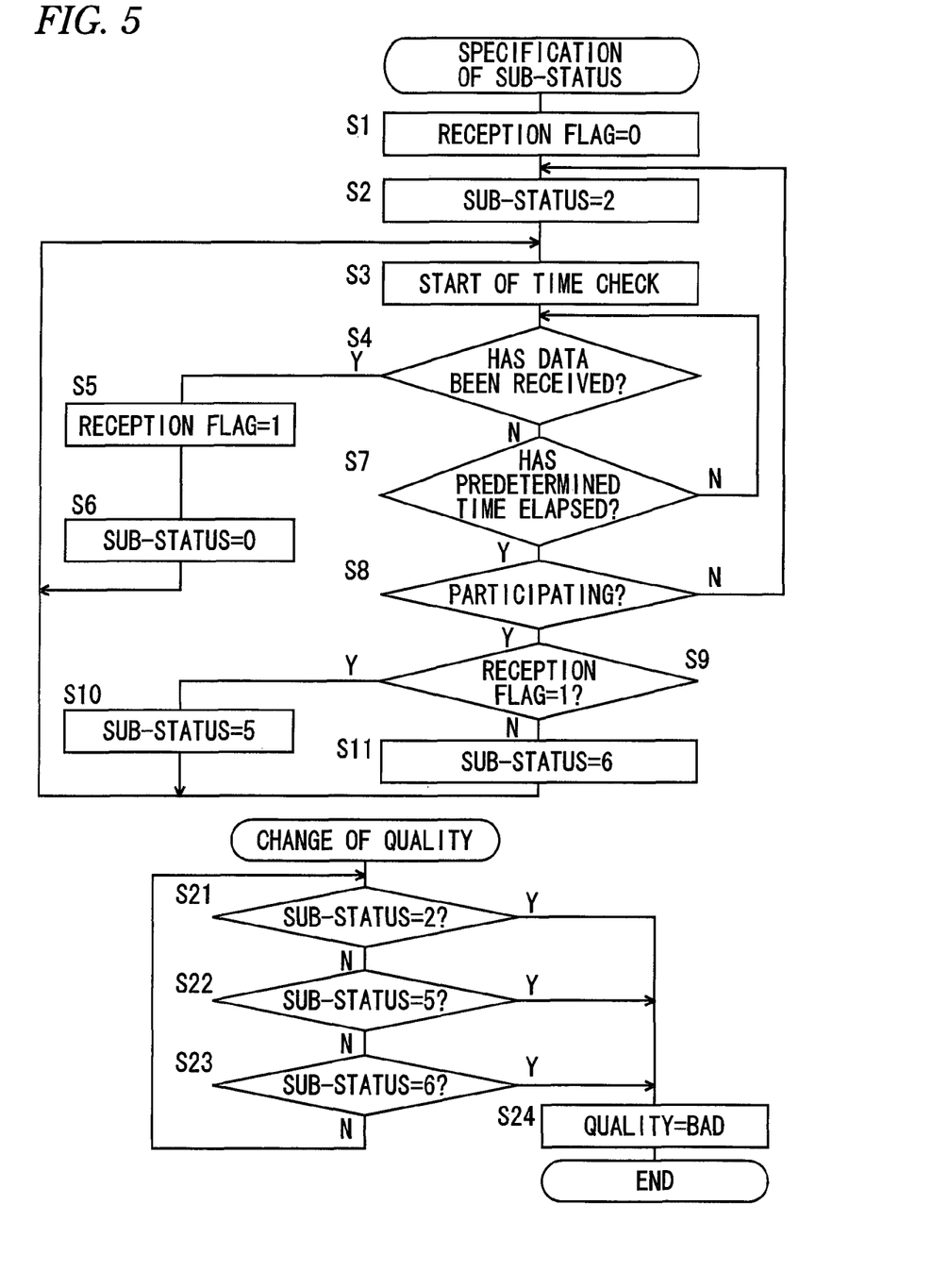
FIG. 5 is a flow chart showing the process of a Modbus/TCP server regarding a control of the value of "status".

FIG. 5 is a flow chart showing the process of the Modbus/TCP server 21 regarding a control of the value of the "status" written in the Modbus register 21a.

Steps S1 to S11 of FIG. 5 indicate processing of specifying the value of the "sub-status" on the basis of a state of communication with the field device 1. Moreover, in this processing, the initial value (data value of the data received from the field device 1) of the "sub-status" is set to "0".

In step S1 of FIG. 5, the value of a reception flag is set to "0". This reception flag indicates the existence of data-received history.

Then, in step S2, the value of "sub-status" of the corresponding data is set to "2".

Then, in step S3, a timer is reset to start time checking. Then, in step S4, it is determined whether or not the corresponding data has been received. If the determination result is affirmative, the process proceeds to step S5. If the determination result is negative, the process proceeds to step S7.

In step S5, the value of the reception flag is set to "1". Then, in step S6, the value of the "sub-status" of corresponding data is set to "0", and the process returns to step S3.

On the other hand, in step S7, it is determined whether or not a predetermined time has elapsed from the start of time check (step S3). If the determination result is affirmative, the process proceeds to step S8. If the determination result is negative, the process returns to step S4. In addition, the predetermined time to be determined in step S7 is equivalent to a time of time-out for determination of communication failure.

In step S8, it is determined whether or not the corresponding field device 1 participates in the ISA100 network. If the determination result is affirmative, the process proceeds to step S9. If the determination result is negative, the process returns to step S2.

In step S9, it is determined whether or not the value of the reception flag is "1". If the determination result is affirmative, the process proceeds to step S10. If the determination result is negative, the process proceeds to step S11.

In step S10, the value of the "sub-status" is set to "5", and the process proceeds to step S3.

On the other hand, in step S11, the value of the "sub-status" is set to "6", and the process proceeds to step S3.

Steps S21 to S24 of FIG. 5 indicate processing of the Modbus/TCP server 21 for changing the value of the "quality".

In step S21, it is determined whether or not the value of the "sub-status" of the corresponding data is "2". If the determination result is affirmative, the process proceeds to step S24. If the determination result is negative, the process proceeds to step S22.

In step S22, it is determined whether or not the value of the "sub-status" of the corresponding data is "5". If the determination result is affirmative, the process proceeds to step S24. If the determination result is negative, the process proceeds to step S23.

In step S23, it is determined whether or not the value of the "sub-status" of the corresponding data is "6". If the determination result is affirmative, the process proceeds to step S24. If the determination result is negative, the process returns to step S21.

In step S24, the value of the "quality" of the corresponding data is set to "0", and the process ends.

Thus, in the field communication system of the present embodiment, the state of communication with the field device 1 is indicated by the value of the "sub-status" and the value of "sub-status" is reflected on the value of the "quality". For this reason, the Modbus/TCP client 3 can read the value of the "quality" and determine that the data cannot be trusted if the value is "0". In addition, details of the causes of malfunction can be seen by checking the value of the "sub-status" at that time. For example, it is possible to make the process data, which is referred to in the control application, determined to be IOP (Input Open) or to provide notification of an abnormal situation by a system alarm.

In addition, when the value of the "quality" is "1", the data received from the field device 1 is data which cannot be used for control due to over range or the like. Accordingly, the Modbus/TCP client 3 should continue the state before the value of the "quality" becomes "1". That is, the Modbus/TCP client 3 should operate as follows.

First, when the value of the "quality" changes from "0" to "1", the Modbus/TCP client 3 does not determine that the quality of the data has returned to the "good" state. Secondly, when the value of the "quality" changes from "2" to "1", the Modbus/TCP client 3 does not trust the data and holds the most recent data when the value of the "quality" was "2".

As described above, according to the field communication system of the present embodiment, communication errors caused by failure of the field device 1 based on the ISA100.11a field wireless standard, abnormalities of the ISA100 wireless network state, and the like can be checked on the basis of the "status" added to the data acquired from the Modbus/TCP server 21. Therefore, it becomes possible to find and restore the failure or abnormalities in the early stage. As a result, the rate of operation of the entire system can be improved.

In the above-described embodiment, the case where the field device is connected to the ISA100 wireless network is illustrated. However, also when wireless communication or cable communication based on another method is used, the information equivalent to the "status" can be added to the data in a server if it is a system with a configuration where a higher-order server collects the data of a low-order field device. In addition, although the processing of the Modbus/TCP server is illustrated in the above-described embodiment, the same processing can be executed by using a Modbus slave function or an OPC server function.

The application range of the invention is not limited to the embodiment described above. The invention can be widely applied to field communication systems which receive data from a field device through a communication network and map the data onto a register to update the data.

While certain embodiments have been described, these embodiments have been presented by way of example only, and are not intended to limit the scope of the invention. Indeed, the novel system described herein may be embodied in a variety of other forms; furthermore, various omissions, substitutions and changes in the form of the system, described herein may be made without departing from the sprit of the invention. The accompanying claims and their equivalents are intended to cover such forms or modifications as would fall within the scope and sprit of the invention.

What is claimed is:

1. A field communication system configured to receive data from a field device through a communication network and to map the data onto a register to update the data, the field communication system comprising:

a detection module configured to detect a state of communication with the field device through the communication network, the state of communication being indicative of whether the data received from the field device and mapped onto the register has been updated or not; and a writing module configured to write the state of communication detected by the detection module in the register as information added to the data, wherein self-diagnosis information of the field device is included in the data from the field device and is mapped onto the register, and wherein when the detection module detects that the state of communication with the field device through the network is indicative of the state of communication in which the data received from the field device and mapped onto the register has not been updated, the writing module is configured to rewrite the self-diagnosis information mapped onto the register to reflect a state indicating that the data mapped onto the register is unreliable.

2. The field communication system according to claim 1, wherein the detection module is configured to detect, as the state of communication, whether or not the field device participates in the communication network.

3. The field communication system according to claim 1, wherein the detection module is configured to detect, as the state of communication, whether or not reception of the data from the field device through the communication network which has been continued until then has stopped.

4. The field communication system according to claim 1, wherein the detection module is configured to detect, as the state of communication, whether or not reception of the data from the field device through the communication network continues to be stopped from after the time of participation in the communication network.

5. The field communication system according to claim 1, wherein the communication network is a wireless network.

6. The field communication system according to claim 2, wherein the communication network is a wireless network.

7. The field communication system according to claim 3, wherein the communication network is a wireless network.

8. The field communication system according to claim 4, wherein the communication network is a wireless network.

* * * * *